(12) United States Patent
Nakashima et al.

(10) Patent No.: US 6,387,510 B1
(45) Date of Patent: May 14, 2002

(54) GLASS FOR A DATA STORAGE MEDIUM SUBSTRATE AND GLASS SUBSTRATE FOR DATA STORAGE MEDIA

(75) Inventors: Tetsuya Nakashima; Yasumasa Nakao; Akio Koike, all of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/546,609

(22) Filed: Apr. 10, 2000

(30) Foreign Application Priority Data

Apr. 13, 1999 (JP) .............................. 11-105653

(51) Int. Cl.$^7$ .................. B32B 17/06; C03C 3/076; C03C 3/085; C03C 3/095
(52) U.S. Cl. ............... 428/426; 428/64.2; 428/65.3; 428/195; 428/702; 501/55; 501/64; 501/68; 501/69; 501/70; 501/72
(58) Field of Search .................... 501/55, 64, 68, 501/69, 70, 72; 428/64.1, 64.2, 64.3, 65.3, 410, 426, 694, 195, 702

(56) References Cited

U.S. PATENT DOCUMENTS 3,540,893 A * 11/1970 Petticrew
3,958,052 A * 5/1976 Galusha et al.
5,900,296 A 5/1999 Hayashi et al.
5,902,665 A * 5/1999 Kuroda

FOREIGN PATENT DOCUMENTS

JP 03045533 A * 2/1991

* cited by examiner

Primary Examiner—Deborah Jones
Assistant Examiner—Jennifer McNeil
(74) Attorney, Agent, or Firm—Oblon, Spivak, McClelland, Maier & Neustadt, P.C.

(57) ABSTRACT

A glass for a data storage medium substrate, which consists essentially of the following components as represented by mol %:

| | |
|---|---|
| $SiO_2$ | 60 to 72, |
| $Al_2O_3$ | 2 to 9 |
| MgO | 3 to 9, |
| CaO | 2 to 10, |
| SrO | 0 to 15, |
| ZnO | 0 to 4, |
| $TiO_2$ | 0 to 8, |
| $ZrO_2$ | 0 to 4, |
| $Li_2O$ | 1 to 12, |
| $Na_2O$ | 0 to 8, |
| $K_2O$ | 0 to 5, |
| $Y_2O_3$ | 0 to 5, |
| $La_2O_3$ | 0 to 5, and |
| $Li_2O + Na_2O + K_2O$ | 4 to 15, | and which has a Young's modulus of at least 85 GPa.

19 Claims, No Drawings

GLASS FOR A DATA STORAGE MEDIUM SUBSTRATE AND GLASS SUBSTRATE FOR DATA STORAGE MEDIA

BACKGROUND OF THE INVENTION

1. Field of the Invention

The present invention relates to a glass for a data storage medium substrate, particularly a glass for a magnetic recording medium substrate and a glass substrate for data storage media, particularly a glass substrate for magnetic recording media, having a high Young's modulus.

2. Discussion of Background

Glass substrates have been used as substrates for data storage media, particularly as substrates for magnetic disks (hard disks), and a glass (hereinafter referred to as conventional glass) consisting of 65.3 mol % of $SiO_2$, 8.6 mol % of $Al_2O_3$, 3.5 mol % of $ZrO_2$, 12.5 mol % of $Li_2O$ and 10.1 mol % of $Na_2O$ is mentioned as an example. The conventional glass is usually subjected to chemical tempering treatment before use.

In recent years, in order to increase the storage capacity, it has been desired to increase the number of magnetic disks mounted by making the substrates thin. On the other hand, the space between a magnetic disk and a magnetic reading head has become small in order to increase the storage density, and accordingly, increase in bending or warp of the substrates caused by making the substrates thin, may break the magnetic disks.

To solve such a problem of bending and warp of the substrates, a glass having a high Young's modulus has been desired. Here, the Young's modulus of the above conventional glass is 82 GPa.

Further, it is required for a substrate for data storage media that its surface state does not significantly change during stock, and that films formed on said substrate, such as a base film, a magnetic film and a protective film, are not likely to separate off. Namely, corrosion resistance is required.

The corrosion resistance of the conventional glass is by no means high, but it will improve to an acceptable level by chemical tempering treatment. This is considered to be because an alkali component which is considered to be the main cause to decrease the corrosion resistance of the conventional glass is extracted and removed from the surface of the glass by the chemical tempering treatment. However, there are problems in the chemical tempering treatment such that the steps will increase, the surface of the substrate after the chemical tempering treatment is likely to be soiled, etc.

Further, in order to increase the storage density, it is effective to increase the coercive force of a magnetic layer as a magnetic recording layer, and accordingly, it is necessary to carry out heat treatment to form the magnetic layer at a higher temperature. From this point of view, a glass to be used for a substrate is required to have a high glass transition temperature. Here, the glass transition temperature of the above conventional glass is 500° C.

Conventionally, the glass substrates for magnetic disks have been mainly used as 2.5 inch substrates (glass substrate outer diameter: 65 mm) to be used for e.g. notebook size personal computers. However, there is a high possibility that the glass substrates are increasingly used as larger substrates to be used for e.g. servers, i.e. 3.0 inch substrates (glass substrate outer diameter: 84 mm), 3.5 inch substrates (glass substrate outer diameter: 95 mm), etc. Accordingly, the glass to be used for such glass substrates, is required to be suitable for mass production.

The mass production of the glass is carried out by means of a glass melting furnace. An AZS ($Al_2O_3$—$ZrO_2$—$SiO_2$) type electrocast brick is usually used for the glass melting furnace at a portion which will be directly in contact with molten glass. Accordingly, the corrosiveness of molten glass against the AZS type electrocast brick is required to be small.

Further, the mass production of a sheet glass is widely carried out by a continuous forming method represented by float process. As the continuous forming method, in addition to the float process, fusion down draw process and slot down draw process may, for example, be mentioned. Accordingly, the glass is required to be produced by a continuous forming such as float process.

WO99/06333 discloses a method for producing a glass substrate for data storage media, which comprises direct press forming of a glass having a Young's modulus of at least 90 GPa and consisting of from 0.1 to 30 mol % of $TiO_2$, from 1 to 45 mol % of CaO, from 5 to 40 mol % of MgO+CaO, from 3 to 30 mol % of $Na_2O+Li_2O$, from 0 to 15 mol % of $Al_2O_3$ and from 35 to 65 mol % of $SiO_2$. Here, the direct press forming is not a continuous forming method.

The present inventors have conducted a follow-up examination on some of glass as disclosed in WO99/06333 (Examples 41 and 42 in Table 5 as shown hereinafter). As a result, they have considered that it is difficult to produce a sheet glass by applying a continuous forming method to the glass as disclosed in WO99/06333.

SUMMARY OF THE INVENTION

It is an object of the present invention to solve the above problems, and to provide a glass for a data storage medium substrate, particularly a glass for a magnetic recording medium substrate and a glass substrate for data storage media, particularly a glass substrate for magnetic recording media.

The present invention provides a glass for a data storage medium substrate, which consists essentially of the following components as represented by mol %:

| | |
|---|---|
| $SiO_2$ | 60 to 72, |
| $Al_2O_3$ | 2 to 9 |
| MgO | 3 to 9, |
| CaO | 2 to 10, |
| SrO | 0 to 15, |
| ZnO | 0 to 4, |
| $TiO_2$ | 0 to 8, |
| $ZrO_2$ | 0 to 4, |
| $Li_2O$ | 1 to 12, |
| $Na_2O$ | 0 to 8, |
| $K_2O$ | 0 to 5, |
| $Y_2O_3$ | 0 to 5, |
| $La_2O_3$ | 0 to 5, and |
| $Li_2O + Na_2O + K_2O$ | 4 to 15, | and which has a Young's modulus of at least 85 GPa, and a glass substrate for data storage media comprising the glass for a data storage medium substrate.

DETAILED DESCRIPTION OF THE PREFERRED EMBODIMENTS

Now, the present invention will be described in detail with reference to the preferred embodiments.

The Young's modulus of the glass for a data storage medium substrate of the present invention (hereinafter referred to simply as glass of the present invention) is at least 85 GPa. If it is less than 85 GPa, the problem of bending and warp may arise. It is preferably at least 88 GPa, more preferably at least 90 GPa.

The glass transition temperature of the glass of the present invention is preferably at least 550° C. If it is less than 550° C., the temperature for heat treatment for forming a magnetic layer can not be made adequately high, hereby it tends to be difficult to increase the coercive force of the magnetic layer. It is more preferably at least 560° C., furthermore preferably at least 570° C., still furthermore preferably at least 580° C., particularly preferably at least 600° C., and most preferably at least 610° C.

The glass of the present invention preferably satisfies $T_L - T_4 < 50$, where $T_L$ is the liquidus temperature (unit: ° C.), and $T_4$ is the temperature (unit: ° C.) at which the viscosity becomes $10^4 P$ (poise). If $T_L - T_4 \geq 50$, it may be difficult to form the sheet glass by a continuous forming such as float process. More preferably $T_L - T_4 < 40$, particularly preferably $T_L - T_4 < 30$.

Now, the composition of the glass of the present invention as represented by mol % (hereinafter "mol %" will be referred to simply as "%") will be explained.

The glass of the present invention preferably consists essentially of:

| | |
|---|---|
| $SiO_2$ | 60 to 72, |
| $Al_2O_3$ | 2 to 8, |
| MgO | 3 to 8, |
| CaO | 3 to 10, |
| SrO | 0 to 8, |
| ZnO | 0 to 4, |
| $TiO_2$ | 1 to 8, |
| $ZrO_2$ | 0.2 to 4, |
| $Li_2O$ | 1 to 12, |
| $Na_2O$ | 0 to 3, |
| $K_2O$ | 0 to 2, |
| $Y_2O_3$ | 0 to 5, |
| $La_2O_3$ | 0 to 5, and |
| $Li_2O + Na_2O + K_2O$ | 4 to 14. |

More preferably, the glass of the present invention consists essentially of:

| | |
|---|---|
| $SiO_2$ | 62 to 70, |
| $Al_2O_3$ | 3 to 7, |
| MgO | 3.5 to 7.5, |
| CaO | 3.5 to 8, |
| SrO | 0.5 to 7, |
| ZnO | 0 to 3.5, |
| $TiO_2$ | 1.5 to 7, |
| $ZrO_2$ | 0.4 to 3, |
| $Li_2O$ | 2 to 10, |
| $Na_2O$ | 0.1 to 2.5, |
| $K_2O$ | 0.1 to 1.5, |
| $Y_2O_3$ | 0.2 to 4, |
| $La_2O_3$ | 0 to 4, and |
| $Li_2O + Na_2O + K_2O$ | 4.5 to 13. |

Particularly preferably, the glass of the present invention consists essentially of:

| | |
|---|---|
| $SiO_2$ | 63 to 69, |
| $Al_2O_3$ | 4 to 6, |
| MgO | 4 to 7, |
| CaO | 4 to 7, |
| SrO | 1 to 5, |
| ZnO | 0 to 3, |
| $TiO_2$ | 2 to 6, |
| $ZrO_2$ | 0.6 to 2, |
| $Li_2O$ | 4 to 8, |
| $Na_2O$ | 0.2 to 2, |
| $K_2O$ | 0.2 to 1, |
| $Y_2O_3$ | 0.5 to 3, |
| $La_2O_3$ | 0 to 3, and |
| $Li_2O + Na_2O + K_2O$ | 5 to 10. |

$SiO_2$ is an essential component to form the network of the glass. If it is less than 60%, $T_L$ tends to be too high. It is preferably at least 60.5%, more preferably at least 61%, particularly preferably at least 62%, most preferably at least 63%. If it exceeds 72%, the Young's modulus tends to be low. It is preferably at most 70%, more preferably at most 69%.

$Al_2O_3$ is an essential component to increase the Young's modulus and to increase the corrosion resistance. If it is less than 2%, the above effects tend to be small. It is preferably at least 3%, more preferably at least 4%. If it exceeds 9%, $T_L$ tends to be too high, and the corrosiveness against the AZS type electrocast brick tends to be substantial. It is preferably at most 8%, more preferably at most 7.5%, particularly preferably at most 7%, most preferably at most 6%.

The total content of $SiO_2$ and $Al_2O_3$ is preferably at least 66%. If it is less than 66%, $T_L$ tends to be too high, $T_4$ tends to be too low, or $T_L - T_4$ tends to be too high. It is more preferably at least 66.5%, particularly preferably at least 67%.

MgO is an essential component and is effective to increase the Young's modulus and to improve the meltability of the glass. If it is less than 3%, the above effects tend to be small. It is preferably at least 3.5%, more preferably at least 4%, most preferably at least 5%. If it exceeds 9%, $T_L$ tends to be too high. It is preferably at most 8%, more preferably at most 7.5%, particularly preferably at most 7%.

CaO is an essential component and is effective to increase the Young's modulus and to improve the meltability of the glass. If it is less than 2%, the above effects tend to be small. It is preferably at least 3%, more preferably at least 3.5%, particularly preferably at least 4%. If it exceeds 10%, $T_L$ tends to be too high. It is preferably at most 8%, more preferably at most 7.5%, particularly preferably at most 7%.

SrO is not an essential component, but is effective to lower $T_L$ and to improve the meltability of the glass, and may be incorporated up to 15%. If it exceeds 15%, the Young's modulus tends to be low. It is preferably at most 10%, more preferably at most 9.5%, furthermore preferably at most 9%, still furthermore preferably at most 8%, particularly preferably at most 7%, most preferably at most 5%. When SrO is incorporated, its content is preferably at least 0.5%, more preferably at least 1%.

ZnO is not an essential component, but is effective to increase the Young's modulus and to improve the meltability of the glass, and may be incorporated up to 4%. If it exceeds 4%, $T_L$ tends to be too high. It is preferably at most 3.5%, more preferably at most 3%, particularly preferably at most 2.5%.

$TiO_2$ is not an essential component, but is effective to increase the Young's modulus and to increase the corrosion resistance, and may be incorporated up to 8%. If it exceeds 8%, $T_L$ tends to be too high, or phase separation phenomenon tends to occur. It is preferably at most 7%, more preferably at most 6%. Further, when $TiO_2$ is incorporated, its content is preferably at least 1%, more preferably at least 1.5%, particularly preferably at least 2%.

Here, when it is attempted to lower $T_L$, or it is attempted to suppress the phase separation phenomenon, it is preferred that substantially no $TiO_2$ is incorporated. Typically, it is at most 0.05%, more preferably at most 0.02%.

$ZrO_2$ is not an essential component, but is effective to increase the Young's modulus, and may be incorporated up to 4%. If it exceeds 4%, $T_L$ tends to be too high. It is preferably at most 3%, more preferably at most 2%. Further, when $ZrO_2$ is incorporated, its content is preferably at least 0.2%, more preferably at least 0.4%, particularly preferably at least 0.6%.

$Li_2O$ is an essential component to increase the Young's modulus. If it is less than 1%, the above effect tends to be small. It is preferably at least 2%, more preferably at least 4%. If it exceeds 12%, $T_L$ tends to be too high. It is preferably at most 10%, more preferably at most 8%.

$Na_2O$ is not an essential component, but is effective to improve the meltability of the glass, and may be incorporated up to 8%. If it exceeds 8%, the Young's modulus tends to decrease. It is preferably at most 6%, more preferably at most 5.5%, furthermore preferably at most 5.2%, particularly preferably at most 2.5%, most preferably at most 2%. Further, when $Na_2O$ is incorporated, its content is preferably at least 0.1%, more preferably at least 0.2%.

$K_2O$ is not an essential component, but is effective to improve the meltability of the glass, and may be incorporated up to 5%. If it exceeds 5%, the Young's modulus tends to be low. It is preferably at most 4.7%, more preferably at most 4.4%, particularly preferably at most 1.5%, most preferably at most 1%. Further, when $K_2O$ is incorporated, its content is preferably at least 0.1%, more preferably at least 0.2%.

$Y_2O_3$ is not an essential component, but is effective to increase the Young's modulus, and may be incorporated up to 5%. If it exceeds 5%, $T_L$ tends to be too high. It is preferably at most 4%, more preferably at most 3%. Further, when $Y_2O_3$ is incorporated, its content is preferably at least 0.2%, more preferably at least 0.5%.

$La_2O_3$ is not an essential component, but is effective to increase the Young's modulus, and may be incorporated up to 5%. If it exceeds 5%, $T_L$ tends to be too high. It is preferably at most 4%, more preferably at most 3%.

The total content of $Li_2O$, $Na_2O$ and $K_2O$ is from 4% to 15%. If it less than 4%, the meltability of the glass tends to be low, and $T_L$ tends to be too high. It is preferably at least 4.5%, more preferably at least 5%. If it exceeds 15%, the Young's modulus tends to be low, the corrosion resistance tends to be low, and the corrosiveness against the AZS type electrocast brick tends to be substantial. It is preferably at most 14%, more preferably at most 13%, particularly preferably at most 11%, most preferably at most 10%.

The glass of the present invention consists essentially of the above components. However, in addition to the above components, the following components may be incorporated within a range of not impairing the object of the present invention.

A refining agent such as $SO_3$, Cl, $As_2O_3$ or $Sb_2O_3$ may be incorporated in a total amount of at most 1%.

BaO may be incorporated in an amount of at most 2% to obtain the same effects as SrO.

$SnO_2$ may be incorporated in an amount of at most 2% to obtain the same effects as $TiO_2$.

A rare earth metal oxide such as $Ta_2O_5$, $Nb_2O_5$ or $CeO_2$ may be incorporated in a total amount of at most 3% to obtain the same effect as $Y_2O_3$, i.e. to increase the Young's modulus, and to obtain e.g. an effect to increase the corrosion resistance.

$B_2O_3$, $P_2O_5$, $V_2O_5$, etc., may be incorporated in a total amount of at most 3% to improve the stability and the meltability of the glass.

Here, when it is attempted to further lower $T_L$, it is preferred that substantially no $Sc_2O_3$, $Y_2O_3$, $La_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ nor $Lu_2O_3$ is incorporated.

The glass substrate for data storage media of the present invention (hereinafter referred to simply as glass substrate of the present invention) comprises the glass of the present invention, and is a glass sheet cut to have a predetermined size and shape.

The glass substrate of the present invention is preferably such that on the surface of said glass substrate having been held in a water vapor atmosphere under 2 atm at 120° C. for 20 hours, the number $N_L$ of deposits having sizes of at least 10 $\mu$m, is not more than 1 per $cm^2$, and the number $N_s$ of deposits having sizes of at least 1 $\mu$m and less than 10 $\mu$m, is not more than $10^5$ per $cm^2$.

If $N_L$ exceeds 1 per $cm^2$ or $N_s$ exceeds $10^5$ per $cm^2$, deposits (corrosion) will form on the surface of the glass substrate during stock, whereby films such as a base film, a magnetic film and a protective film, to be formed on the glass substrate, are likely to separate off. The deposits are considered to be a reaction product formed and attached to the glass substrate by water content and carbonic acid gas in the air, and they can not be wiped away. $N_L$ is more preferably not more than 0.5 per $cm^2$, particularly preferably not more than 0.2 per $cm^2$. $N_s$ is more preferably not more than $0.8 \times 10^5$ per $cm^2$, particularly preferably not more than $0.6 \times 10^5$ per $cm^2$.

The methods for producing the glass and the glass substrate of the present invention are not particularly limited, and various methods may be applied. For example, starting materials of the respective components which are commonly used, are mixed to have a desired composition, and the batch is heated and melted in a glass melting furnace. The glass is homogenized by e.g. bubbling, stirring or addition of a refining agent, and the homogenized glass is formed into a sheet glass having a predetermined thickness by a known method such as float process, pressing process, fusion down draw process or slot down draw process, and annealed followed by processing such as cutting or polishing as the case requires, to obtain a glass substrate having a predetermined size and shape. As the forming method, the float process suitable for mass production is particularly preferred. Further, a continuous forming method other than the float process, i.e. the fusion down draw process or the slot down draw process is also preferred.

The glass and the glass substrate of the present invention are suitable particularly for magnetic disk substrates.

Now, the present invention will be described in further detail with reference to Examples. However, it should be understood that the present invention is by no means restricted to such specific Examples.

EXAMPLES

Starting materials of the respective components were mixed to have a composition shown by mol % in the columns "SiO$_2$" to "La$_2$O$_3$" of Tables, and the batch was melted at a temperature of from 1,450 to 1,550° C. for from 3 to 5 hours in a platinum crucible. For melting, a platinum stirrer was inserted in the molten glass followed by stirring for 2 hours to homogenize the glass. Then, the molten glass was cast to form a sheet, followed by annealing. Here, "R$_2$O total amount" in Tables represents the total content (unit: mol %) of Li$_2$O, Na$_2$O and K$_2$O.

With respect to each glass sheet obtained, the Young's modulus E (unit: GPa), the glass transition temperature $T_g$ (unit: ° C.), the liquidus temperature $T_L$ (unit: ° C.), the temperature $T_4$ (unit: ° C.) at which the viscosity becomes $10^4$p, the above $N_L$ (unit: number per cm$^2$) and the above $N_s$ (unit: ×10$^5$ per cm$^2$) were measured by the following methods. The results are shown in Tables.

E: Measured by a supersonic pulse method with respect to a glass plate having a thickness of from 10 to 20 mm and a size of 4 cm×4 cm.

$T_g$: Using a differential dilatometer, elongation of the glass was measured when the temperature was raised at a rate of 5° C./min from room temperature to the temperature at which expansion will no longer be observed even if the glass is softened, i.e. to the yield point, using quartz glass as a reference specimen, and a temperature corresponding to the bending point in the obtained thermal expansion curve was taken as the glass transition temperature.

$T_L$: The glass was pulverized into glass grains of about 2 mm by a mortar, and the glass grains were spread on a platinum board followed by heat treatment in a temperature-gradient furnace for 24 hours. The maximum value among the temperatures that the glass was devitrified, was taken as the liquidus temperature.

$T_4$: Measured by a rotational viscometer.

$N_L$, $N_s$: Both sides of a glass plate having a size of 4 cm×4 cm and a thickness of from 1 to 2 mm were polished, and washed with calcium carbonate and a detergent. Then, the glass plate was put in an ultra accelerated life tester (unsaturated type pressure cooker TPC-410, manufactured by TABAI ESPEC CORP.) and left at rest in a water vapor atmosphere under 2 atm at 120° C. for 20 hours. The surface of the glass plate taken out with an area of a 200 μm square was observed by a differential interference microscope, and the number of deposits having sizes of 10 μm, and the number of deposits having sizes of at least 1 μm and less than 10 μm were counted.

Examples 1 to 39 are Examples of the present invention, and Examples 40 to 42 are Comparative Examples. The glass in Examples 40 is a conventional glass, and glasses in Examples 41 and 42 are glasses as disclosed in WO99/06333.

TABLE 1

| | Ex. No. | | | | | | | | | |
|---|---|---|---|---|---|---|---|---|---|---|
| | 1 | 2 | 3 | 4 | 5 | 6 | 7 | 8 | 9 | 10 |
| SiO$_2$ | 66.0 | 66.0 | 66.0 | 66.0 | 66.0 | 64.2 | 67.0 | 65.0 | 65.4 | 64.4 |
| Al$_2$O$_3$ | 5.0 | 5.0 | 5.0 | 5.0 | 4.0 | 4.5 | 4.5 | 5.5 | 5.8 | 5.8 |
| MgO | 5.5 | 5.5 | 5.5 | 5.3 | 5.5 | 5.7 | 5.4 | 6.0 | 6.5 | 7.0 |
| CaO | 5.7 | 5.5 | 5.5 | 5.3 | 6.5 | 6.7 | 5.5 | 7.0 | 6.8 | 5.0 |
| SrO | 3.5 | 3.7 | 4.2 | 4.0 | 2.8 | 3.5 | 3.6 | 4.3 | 5.3 | 3.0 |
| ZnO | 0 | 0 | 0 | 0 | 1.0 | 0.5 | 0 | 0 | 0 | 0 |
| TiO$_2$ | 3.5 | 3.5 | 3.5 | 3.1 | 3.5 | 4.0 | 2.8 | 2.0 | 0 | 2.0 |
| ZrO$_2$ | 1.5 | 1.0 | 1.0 | 1.0 | 1.2 | 1.2 | 1.2 | 1.2 | 1.2 | 1.3 |
| Li$_2$O | 6.0 | 6.5 | 6.5 | 6.8 | 5.0 | 6.0 | 6.5 | 6.0 | 6.1 | 6.5 |
| Na$_2$O | 0.8 | 0.5 | 0.5 | 0.5 | 2.0 | 1.2 | 1.0 | 0.8 | 0.8 | 1.7 |
| K$_2$O | 0.5 | 0.3 | 0.3 | 0.5 | 1.0 | 1.0 | 1.0 | 0.5 | 0.5 | 1.7 |
| Y$_2$O$_3$ | 2.0 | 2.5 | 2.0 | 2.5 | 1.5 | 1.5 | 1.5 | 1.7 | 1.6 | 1.6 |
| La$_2$O$_3$ | 0 | 0 | 0 | 0 | 0 | 0 | 0 | 0 | 0 | 0 |
| R$_2$O total amount | 7.3 | 7.3 | 7.3 | 7.8 | 8.0 | 8.2 | 8.5 | 7.3 | 7.4 | 9.9 |
| E | 93 | 94 | 93 | 94 | 90 | 92 | 90 | 93 | 92 | 92 |
| $T_g$ | 633 | 629 | 630 | 625 | 618 | 622 | 623 | 621 | 610 | 603 |
| $T_L$ | 1098 | | 1100 | | | | | 1080 | 1080 | 1083 |
| $T_4$ | 1084 | 1071 | 1076 | 1058 | 1060 | 1054 | 1080 | 1070 | 1080 | 1063 |
| $N_L$ | 0 | 0 | 0 | 0 | 0 | 0 | 0 | 0 | 0 | 0 |
| $N_S$ | 0.2 | 0.2 | 0.2 | 0.3 | 0.2 | 0.3 | 0.2 | 0.2 | 0.3 | 0.3 |

TABLE 2

| | Ex. No. | | | | | | | | | |
|---|---|---|---|---|---|---|---|---|---|---|
| | 11 | 12 | 13 | 14 | 15 | 16 | 17 | 18 | 19 | 20 |
| SiO$_2$ | 64.0 | 64.0 | 65.3 | 65.0 | 63.0 | 64.4 | 61.4 | 61.4 | 60.2 | 61.4 |
| Al$_2$O$_3$ | 5.9 | 6.0 | 5.0 | 6.0 | 5.8 | 5.9 | 7.0 | 7.0 | 8.2 | 7.0 |
| MgO | 7.5 | 7.2 | 5.6 | 7.5 | 7.0 | 7.5 | 6.0 | 6.0 | 6.0 | 5.5 |
| CaO | 5.5 | 3.5 | 6.0 | 5.5 | 5.5 | 5.5 | 5.5 | 5.5 | 5.7 | 5.6 |
| SrO | 0.6 | 0 | 4.9 | 1.4 | 1.8 | 1.5 | 4.0 | 2.0 | 2.0 | 2.6 |
| ZnO | 0 | 2.0 | 0 | 0 | 2.0 | 0 | 0 | 0 | 0 | 0 |
| TiO$_2$ | 2.0 | 2.0 | 2.0 | 2.0 | 2.0 | 2.0 | 2.0 | 2.0 | 2.0 | 2.0 |
| ZrO$_2$ | 1.3 | 1.3 | 1.2 | 1.2 | 1.2 | 1.3 | 1.3 | 1.3 | 1.3 | 1.2 |
| Li$_2$O | 6.5 | 7.4 | 5.4 | 6.5 | 6.0 | 6.5 | 6.0 | 6.0 | 6.0 | 6.0 |
| Na$_2$O | 2.0 | 2.0 | 1.2 | 1.5 | 2.0 | 1.8 | 2.2 | 3.2 | 3.2 | 3.2 |

TABLE 2-continued

| | Ex. No. | | | | | | | | | |
|---|---|---|---|---|---|---|---|---|---|---|
| | 11 | 12 | 13 | 14 | 15 | 16 | 17 | 18 | 19 | 20 |
| $K_2O$ | 3.0 | 3.0 | 1.7 | 1.7 | 2.0 | 1.9 | 3.3 | 4.3 | 4.3 | 4.3 |
| $Y_2O_3$ | 1.7 | 1.6 | 1.7 | 1.7 | 1.7 | 1.7 | 1.3 | 1.3 | 1.1 | 1.2 |
| $La_2O_3$ | 0 | 0 | 0 | 0 | 0 | 0 | 0 | 0 | 0 | 0 |
| $R_2O$ total amount | 11.5 | 12.4 | 8.3 | 9.7 | 10.0 | 10.2 | 11.5 | 13.5 | 13.5 | 13.5 |
| E | 90 | 90 | 90 | 91 | 91 | 92 | 89 | 86 | 87 | 86 |
| $T_g$ | 595 | 580 | 615 | 610 | 600 | 603 | 594 | 581 | 589 | 578 |
| $T_L$ | 1100 | 1080 | 1090 | 1100 | 1090 | 1100 | 1070 | 1075 | 1072 | 1058 |
| $T_4$ | 1065 | 1060 | 1075 | 1075 | 1065 | 1070 | 1045 | 1048 | 1053 | 1040 |
| $N_L$ | 0 | 0 | 0 | 0 | 0 | 0 | 0 | 0 | 0 | 0 |
| $N_S$ | 0.4 | 0.5 | 0.3 | 0.4 | 0.4 | 0.4 | 0.4 | 0.5 | 0.5 | 0.5 |

TABLE 3

| | Ex. No. | | | | | | | | | |
|---|---|---|---|---|---|---|---|---|---|---|
| | 21 | 22 | 23 | 24 | 25 | 26 | 27 | 28 | 29 | 30 |
| $SiO_2$ | 62.6 | 62.5 | 62.6 | 63.6 | 63.6 | 62.1 | 62.0 | 62.0 | 62.6 | 61.0 |
| $Al_2O_3$ | 7.5 | 7.0 | 7.0 | 6.0 | 6.0 | 7.0 | 6.0 | 6.0 | 6.0 | 6.0 |
| MgO | 5.7 | 5.4 | 5.4 | 5.4 | 5.4 | 5.4 | 5.1 | 5.1 | 5.3 | 4.5 |
| CaO | 5.9 | 5.5 | 5.5 | 5.5 | 5.5 | 5.4 | 5.2 | 5.2 | 5.3 | 4.5 |
| SrO | 6.9 | 8.1 | 9.0 | 9.0 | 7.0 | 4.0 | 9.0 | 7.0 | 9.0 | 8.6 |
| ZnO | 0 | 0 | 0 | 0 | 2.0 | 0 | 0 | 0 | 2.0 | 0 |
| $TiO_2$ | 2.0 | 3.0 | 3.0 | 3.0 | 3.0 | 2.0 | 3.0 | 3.0 | 3.0 | 3.0 |
| $ZrO_2$ | 1.1 | 1.0 | 1.0 | 1.0 | 1.10 | 1.2 | 1.1 | 1.1 | 1.0 | 1.5 |
| $Li_2O$ | 7.0 | 6.0 | 5.0 | 5.0 | 5.0 | 6.0 | 5.0 | 5.0 | 4.5 | 4.5 |
| $Na_2O$ | 0.8 | 1.0 | 1.0 | 1.0 | 1.0 | 2.9 | 3.1 | 5.1 | 0.8 | 5.5 |
| $K_2O$ | 0.5 | 0.5 | 0.5 | 0.5 | 0.5 | 4.0 | 0.5 | 0.5 | 0.5 | 0.9 |
| $Y_2O_3$ | 0 | 0 | 0 | 0 | 0 | 0 | 0 | 0 | 0 | 0 |
| $La_2O_3$ | 0 | 0 | 0 | 0 | 0 | 0 | 0 | 0 | 0 | 0 |
| $R_2O$ total amount | 8.3 | 7.5 | 6.5 | 6.5 | 6.5 | 12.9 | 8.6 | 10.6 | 5.8 | 10.9 |
| E | 90 | 92 | 92 | 92 | 92 | 85 | 90 | 89 | 93 | 89 |
| $T_g$ | 596 | 605 | 618 | 616 | 611 | 565 | 590 | 578 | 619 | 578 |
| $T_L$ | 1070 | 1060 | 1071 | 1068 | 1070 | 1064 | 1045 | 1043 | 1050 | 1030 |
| $T_4$ | 1047 | 1046 | 1060 | 1056 | 1060 | 1039 | 1025 | 1022 | 1055 | 1020 |
| $N_L$ | 0 | 0 | 0 | 0 | 0 | 0 | 0 | 0 | 0 | 0 |
| $N_S$ | 0.3 | 0.2 | 0.2 | 0.2 | 0.2 | 0.5 | 0.3 | 0.4 | 0.2 | 0.4 |

TABLE 4

| | Ex. No. | | | | | | | | | |
|---|---|---|---|---|---|---|---|---|---|---|
| | 31 | 32 | 33 | 34 | 35 | 36 | 37 | 38 | 39 | 40 |
| $SiO_2$ | 62.6 | 62.6 | 63.2 | 62.6 | 61.3 | 61.4 | 62.4 | 62.1 | 65.0 | 65.3 |
| $Al_2O_3$ | 6.0 | 6.0 | 6.0 | 6.0 | 6.0 | 6.0 | 6.0 | 6.0 | 6.0 | 8.6 |
| MgO | 5.3 | 5.3 | 5.3 | 5.3 | 4.5 | 4.5 | 4.8 | 5.2 | 5.5 | 0 |
| CaO | 5.3 | 5.3 | 5.3 | 5.3 | 4.5 | 4.5 | 4.8 | 5.2 | 5.5 | 0 |
| SrO | 9.0 | 9.0 | 9.4 | 9.0 | 9.6 | 12.2 | 9.0 | 9.0 | 8.8 | 0 |
| ZnO | 2.0 | 2.0 | 2.0 | 1.0 | 2.0 | 0 | 0 | 0 | 2.0 | 0 |
| $TiO_2$ | 3.0 | 3.0 | 3.0 | 3.0 | 0 | 0 | 0 | 0 | 0 | 0 |
| $ZrO_2$ | 1.0 | 1.0 | 0 | 1.0 | 1.5 | 1.5 | 2.0 | 2.0 | 1.2 | 3.5 |
| $Li_2O$ | 4.5 | 4.5 | 4.5 | 4.5 | 4.5 | 4.5 | 4.5 | 4.5 | 5.0 | 12.5 |
| $Na_2O$ | 1.3 | 0 | 0.8 | 0.8 | 5.5 | 4.9 | 6.0 | 5.5 | 1.0 | 10.1 |
| $K_2O$ | 0 | 1.3 | 0.5 | 0.5 | 0.6 | 0.5 | 0.5 | 0.5 | 0 | 0 |
| $Y_2O_3$ | 0 | 0 | 0 | 0 | 0 | 0 | 0 | 0 | 0 | 0 |
| $La_2O_3$ | 0 | 0 | 0 | 1.0 | 0 | 0 | 0 | 0 | 0 | 0 |
| $R_2O$ total amount | 5.8 | 5.8 | 5.8 | 5.8 | 10.6 | 9.9 | 11.0 | 10.5 | 6.0 | 22.6 |
| E | 93 | 92 | 91 | 92 | 87 | 88 | 88 | 89 | 93 | 82 |
| $T_g$ | 618 | 621 | 612 | 630 | 560 | 567 | 566 | 570 | 605 | 500 |
| $T_L$ | 1055 | 1055 | 1050 | 1070 | 1030 | 1025 | 1035 | 1040 | 1080 | 900 |
| $T_4$ | 1052 | 1060 | 1045 | 1060 | 1020 | 1020 | 1030 | 1030 | 1080 | 1010 |
| $N_L$ | 0 | 0 | 0 | 0 | 0 | 0 | 0 | 0 | 0 | $2 \times 10^4$ |
| $N_S$ | 0.2 | 0.2 | 0.3 | 0.2 | 0.5 | 0.5 | 0.5 | 0.5 | 0.3 | 4.0 |

TABLE 5

| Ex. No. | 41 | 42 |
|---|---|---|
| SiO$_2$ | 65.0 | 58.0 |
| Al$_2$O$_3$ | 5.0 | 3.0 |
| MgO | 7.0 | 6.0 |
| CaO | 7.0 | 6.0 |
| SrO | 0 | 0 |
| ZnO | 0 | 0 |
| TiO$_2$ | 1.0 | 8.0 |
| ZrO$_2$ | 5.0 | 2.5 |
| Li$_2$O | 4.0 | 12.0 |
| Na$_2$O | 0 | 4.0 |
| K$_2$O | 0 | 0 |
| Y$_2$O$_3$ | 6.0 | 0.5 |
| La$_2$O$_3$ | 0 | 0 |
| R$_2$O total amount | 4.0 | 16.0 |
| E | 101 | 102 |
| T$_g$ | 620 | 554 |
| T$_L$ | >1300 | 1100 |
| T$_4$ | <1200 | <950 |
| N$_L$ | 0 | 100 |
| N$_S$ | 0.2 | 1.5 |

According to the present invention, it is possible to provide a glass substrate for data storage media having the following characteristics:

(1) The Young's modulus is high, the bending and warp of the substrate are small, and the substrate can be made thin. Accordingly, the number of magnetic disks mounted on a storage device can be increased.

(2) The corrosion resistance is excellent even without chemical tempering treatment, and deposits (corrosion) are less likely to form during stock. Accordingly, separation of films such as a base film, a magnetic film and a protective film, due to the deposits, is less likely to occur.

(3) The glass transition temperature is high, and the temperature for heat treatment for forming a magnetic layer can be made high. Accordingly, the coercive force of the magnetic layer can be increased, whereby the storage density can be increased.

(4) The corrosiveness against the AZS type electrocast brick is small, whereby mass production can be carried out by using a glass melting furnace.

(5) Continuous forming with the AZS type electrocast brick such as float process, fusion down draw process or slot down draw process, can be carried out, and glass substrates of high quality can be mass-produced.

What is claimed is:

1. A glass for a data storage medium substrate, consisting essentially of the following components as represented in mol %:

| | |
|---|---|
| SiO$_2$ | 60 to 72, |
| Al$_2$O$_3$ | 2 to 9 |
| MgO | 3 to 9, |
| CaO | 2 to 10, |
| SrO | 0 to 15, |
| ZnO | 0 to 4, |
| TiO$_2$ | 0 to 8, |
| ZrO$_2$ | 0 to 4, |
| Li$_2$O | 1 to 12, |
| Na$_2$O | 0 to 8, |
| K$_2$O | 0 to 5, |
| Y$_2$O$_3$ | 0 to 5, |
| La$_2$O$_3$ | 0 to 5, and |
| Li$_2$O + Na$_2$O + K$_2$O | 4 to 15, | wherein said glass has a Young's modulus of at least 85 GPa; and wherein (Al$_2$O$_3$—Li$_2$O)≦2.2 mol %.

2. The glass for a data storage medium substrate according to claim 1, wherein the total content of SiO$_2$ and Al$_2$O$_3$ is at least 66 mol %.

3. The glass for a data storage medium substrate according to claim 1, which has a glass transition temperature of at least 550° C.

4. The glass for a data storage medium substrate according to claim 1, which satisfies T$_L$-T$_4$<50, wherein T$_L$ is a liquidus temperature, and T$_4$ is the temperature at which the viscosity becomes 10$^4$ P.

5. A glass substrate for data storage media, which comprises the glass for a data storage medium substrate as defined in claim 1.

6. The glass substrate according to claim 5, wherein on a surface of said glass substrate a number of deposits having a size of at least 10 μm is not more than 1 per cm$^2$, and wherein on said surface of said glass substrate a number of deposits having a size of at least 1 μm and less than 10 μm is not more than 10$^5$ per cm$^2$;

wherein said deposits are present after said substrate has been held in a water vapor atmosphere under 2 atm at 120° C. for 20 hours.

7. The glass substrate according to claim 5, which has been obtained without chemical tempering treatment.

8. The glass according to claim 1, wherein a liquidus temperature T$_L$≦1100° C.

9. The glass according to claim 1, wherein a temperature T$_4$ at which the viscosity becomes 10$^4$ P is at most 1084° C.

10. The glass according to claim 1, which contains no F.

11. The glass according to claim 1, which contains no B$_2$O$_3$.

12. The glass according to claim 1, wherein (ZnO+ZrO$_2$)≧1.0 mol %.

13. The glass according to claim 1, having a glass transition temperature of at least 500° C.

14. The glass according to claim 1, wherein T$_L$-T$_4$<30° C.

15. The glass according to claim 1, having a refining agent selected from the group consisting of SO$_3$, Cl, As$_2$O$_3$ and Sb$_2$O$_3$.

16. The glass according to claim 15, wherein an amount of said refining agent is at most 1 mol % based on a total amount of said glass.

17. The glass according to claim 1, having at most 2 mol % of SnO$_2$.

18. The glass according to claim 1, having a total amount of at most 3% of B$_2$O$_3$, P$_2$O$_5$, V$_2$O$_5$ or a mixture thereof.

19. The glass according to claim 1, having substantially no Sc$_2$O$_3$, Y$_2$O$_3$, La$_2$O$_3$, Pr$_2$O$_3$, Nd$_2$O$_3$, Pm$_2$O$_3$, Sm$_2$O$_3$, Eu$_2$O$_3$, Gd$_2$O$_3$, Tb$_2$O$_3$, Dy$_2$O$_3$, Ho$_2$O$_3$, Er$_2$O$_3$, Tm$_2$O$_3$, Yb$_2$O$_3$ or Lu$_2$O$_3$.

* * * * *